United States Patent [19]
Bacher

[11] 3,721,157
[45] March 20, 1973

[54] LAMINATED TRIMMER FOR HIGH PRESSURE LAMINATED MATERIALS

[76] Inventor: Charles Bacher, 710 Island Ave., McKees Rocks, Pa. 15136

[22] Filed: June 3, 1971

[21] Appl. No.: 149,531

[52] U.S. Cl. .......................... 90/18, 144/134 B, 83/3
[51] Int. Cl. ............................................. B23c 3/12
[58] Field of Search ..... 144/134 R, 134 B; 83/3, 912; 90/18, 12 D, 11 R

[56] References Cited

UNITED STATES PATENTS 2,373,267    4/1945    Schultz ............................ 144/134 R Primary Examiner—Francis S. Husar
Attorney—George Raynovich, Jr.

[57] ABSTRACT

A trimming machine for laminated materials. This device includes a multiple number of plates to which is secured a motor with a bit which will trim the edges of materials to a finished edge.

3 Claims, 4 Drawing Figures

INVENTOR.
CHARLES BACHER

LAMINATED TRIMMER FOR HIGH PRESSURE LAMINATED MATERIALS

This invention relates to machine tools, and more particularly to a trimmer device for high pressure laminated materials.

It is therefore the primary purpose of this invention to provide a trimmer device which will include an electric motor mounted to the top of a plurality of secured together plates, plates having guide fence means for guiding the material that is to have its edge finished.

Another object of this invention is to provide a device of the type described which will have a central U-shaped slot, down through which a cutting tool will rotate to finish the edge of materials passing through the device.

Another object of this invention is to provide a device of the type described which will have a pair of the plates of the device with a recessed edge, the recessed edge providing guide means for the materials.

A further object of this invention is to provide a device of the type described which will have the motor secured by bracket means to the upper plate, all of the plates being secured fixedly by means of a plurality of spaced apart bolt or other fasteners.

A still further object of this invention is to provide a machine of the type described which will be adaptable to metal, wood, plastics and the like.

Other objects of the present invention are to provide a laminated trimmer device for high pressure laminated materials which is simple in design, inexpensive to manufacture, rugged in construction, easy to use and efficient in operation.

These and other objects will be readily evident upon a study of the following specification and the accompanying drawing wherein.

Figure 1:
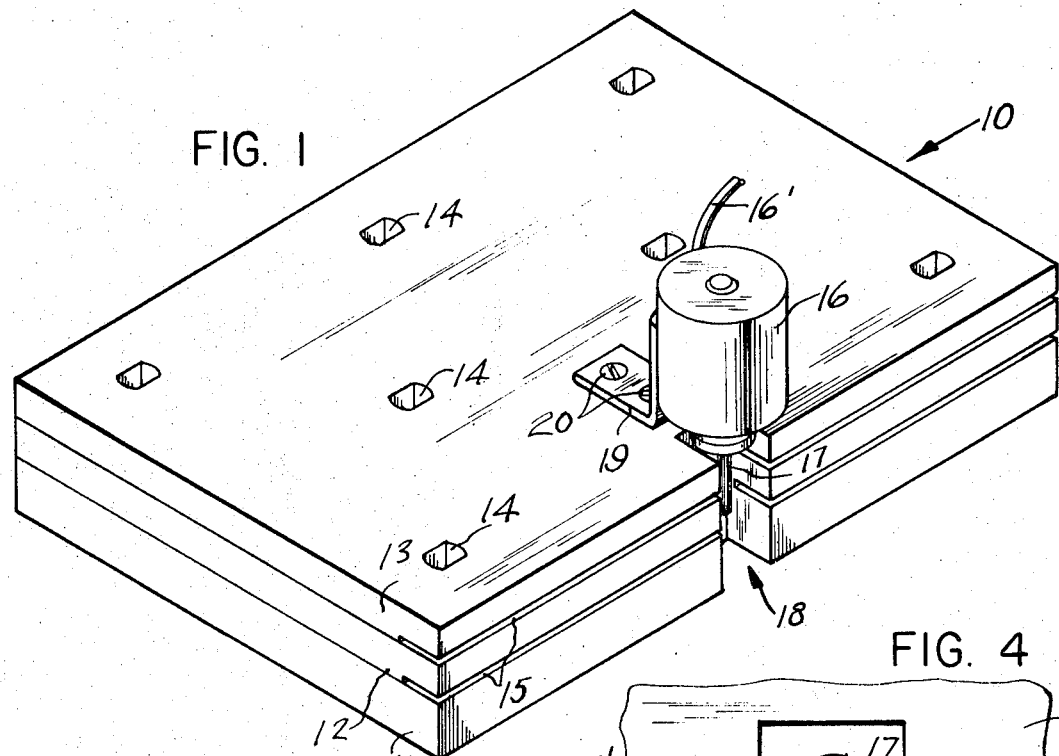
FIG. 1 is a perspective view of the present invention.

According to this invention, a laminated trimmer device 10 is shown to include a plurality of plates 11, 12, and 13 which are fixedly secured together by suitable fasteners (not shown) carried within a plurality of openings 14. Plates 12 and 13 are provided with a recessed slot 15 which serves as guide fence means for material to be trimmed.

An electric motor 16 having a cord 16' is positioned over the opening 18 through plates 11, 12, and 13. The trimming tool bit 17 of motor 16 is freely rotatable within the opening 18 defined within the edge of plates 11, 12, and 13.

A bracket 19 is fixedly secured to the motor 16 housing by suitable means (not shown) and is secured to the top plate 13 by means of a pair of screw fasteners 20 or the like.

Figure 4:
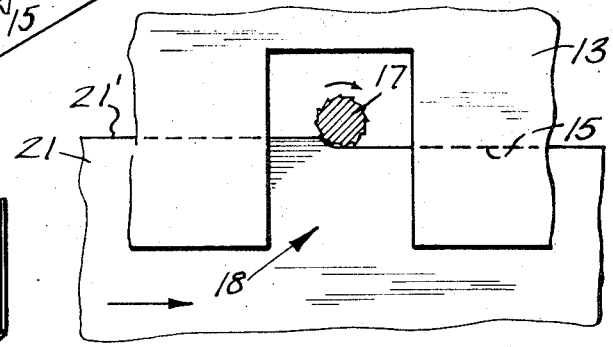
FIG. 4 is a fragmentary top plan view of FIG. 1 showing the material being trimmed by the bit portion of the device.
Figure 2:
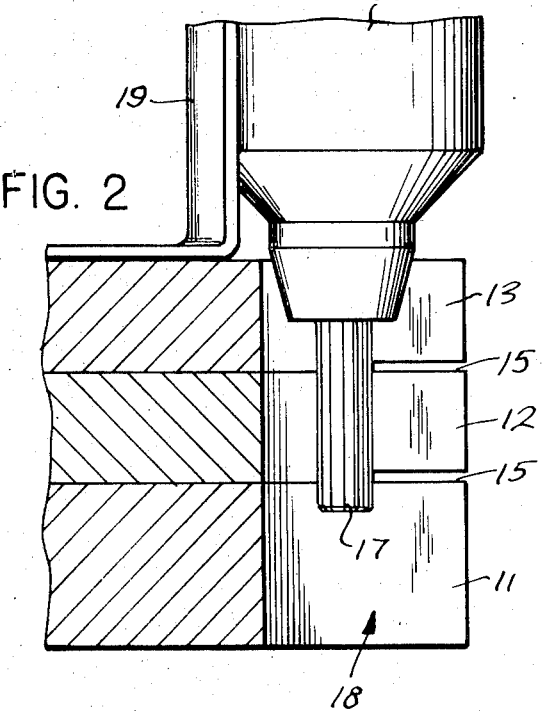
FIG. 2 is an enlarged side view of FIG. 1 shown fragmentated and in elevation.
Figure 3:
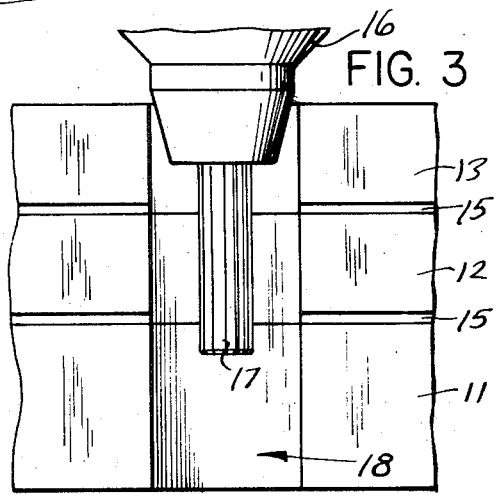
FIG. 3 is an enlarged fragmentary front view of FIG. 1.

In use, as is more graphically illustrated in FIG. 4 of the drawing, the material 21 is passed through one of the slots 15 in order to be guided so as to remove material in order that the edge 21' will be finished.

What I claim is:

1. A trimmer device for finishing the edge of laminated materials, comprising a plurality of secured together and rectangular configurated plates, groove means carried within said plates providing guide fence means for the material being trimmed whereby the edge of said material is received within said groove means so as to be in sliding engagement with the end of said groove means, a vertical and central opening in the edge of said plates containing said groove means, said vertical and central opening extending through all of said plates, bolt means carried by said plates for holding them together, an electric motor with cutting bit means carried by said device with bracket means for rendering it stationary to one of said plates, said cutting bit means being freely rotating within said vertical and central opening and said motor being stationary so as to provide a smooth finished edge for said material passing through said groove means of said device.

2. The device of claim 1 wherein said bracket means are secured to the casing of said motor and to the top one of said plurality of plates by bolt fasteners to render said motor stationary.

3. The device of claim 1 wherein said groove means in said plates are positioned relative to said cutting bit means so that a predetermined amount is trimmed from said material being trimmed each time said material is passed through said groove means.

* * * * *